US010067911B2

(12) United States Patent
Gholaminejad et al.

(10) Patent No.: US 10,067,911 B2
(45) Date of Patent: Sep. 4, 2018

(54) HIGH PERFORMANCE INPLACE TRANSPOSE OPERATIONS

(71) Applicant: Advanced Micro Devices, Inc., Sunnyvale, CA (US)

(72) Inventors: Amir Gholaminejad, Austin, TX (US); Bragadeesh Natarajan, Reno, NV (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 44 days.

(21) Appl. No.: 15/219,672

(22) Filed: Jul. 26, 2016

(65) Prior Publication Data

US 2018/0032477 A1    Feb. 1, 2018

(51) Int. Cl.
| G06F 17/16 | (2006.01) |
| G06F 7/78 | (2006.01) |
| G06F 13/16 | (2006.01) |
| G06F 13/42 | (2006.01) |
| G06F 7/58 | (2006.01) |

(52) U.S. Cl.
CPC .............. G06F 17/16 (2013.01); G06F 7/58 (2013.01); G06F 13/16 (2013.01); G06F 13/4282 (2013.01); *G06F 2213/0026* (2013.01); *G06F 2213/0042* (2013.01)

(58) Field of Classification Search
CPC .................................. G06F 7/78; G06F 17/16
See application file for complete search history.

(56) References Cited

U.S. PATENT DOCUMENTS

| 5,644,517 | A | * | 7/1997 | Ho | G06F 7/78 |
| | | | | | 708/401 |
| 6,141,673 | A | | 10/2000 | Thayer et al. | |
| 9,201,899 | B2 | * | 12/2015 | Nishimura | G06F 9/30032 |
| 2009/0031089 | A1 | * | 1/2009 | Tuominen | G06F 7/785 |
| | | | | | 711/149 |
| 2009/0300310 | A1 | * | 12/2009 | Van Berkel | G06F 13/1694 |
| | | | | | 711/165 |

\* cited by examiner

*Primary Examiner* — Chuong D Ngo
(74) *Attorney, Agent, or Firm* — Meyertons Hood Kivlin Kowert and Goetzel PC; Rory D. Rankin

(57) ABSTRACT

Systems, apparatuses, and methods for performing in-place matrix transpose operations are disclosed. Operations for transposing tiles of a matrix are scheduled in an order determined by moving diagonally through tiles of the matrix. When a diagonal line hits a boundary, then a tile on a new diagonal line of the matrix is selected and operations are scheduled for transposing this tile. Only tiles within a triangular region of the matrix are scheduled for being transposed. This allows memory access operations to be performed in parallel, expediting the matrix transpose operation compared to linear tile indexing.

20 Claims, 7 Drawing Sheets

Matrix 300

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 3

HIGH PERFORMANCE INPLACE TRANSPOSE OPERATIONS

BACKGROUND

Description of the Related Art

Transposition is an important operation in many computing applications. For example, given a matrix A that is an M×N matrix, wherein M and N are positive integers, the transpose of matrix A is the matrix $A^T$ which is created by interchanging the rows and columns of A (i.e., the rows of A are written as the columns of $A^T$). In other words, the transpose of matrix A is generated by reflecting A over its main diagonal (which runs from top-left to bottom-right) to obtain $A^T$. Accordingly, if $A=[a_{ij}]$ then $(A^T)_{ji}=a_{ij}$. Matrices are often transposed when performing other operations, for example, as part of a Fourier transform.

Performing a transpose operation is a memory-bound problem since the transpose operation is primarily one of data movements. Hence, transpose operations cannot hide cache misses, bank conflicts, channel conflicts, etc., with computations as there are no computations. An in-place transpose operation involves transposing a matrix in the same location in memory while an out-place transpose operation involves using different memory locations for the original matrix and the transposed matrix. An out-place transpose operation has high memory overhead and its largest size is limited to less than half of the available memory. In-place transpose operations do not have this memory limitation, but finding ways to carry out in-place transpose operations while performing memory accesses in parallel can be quite challenging.

BRIEF DESCRIPTION OF THE DRAWINGS

The advantages of the methods and mechanisms described herein may be better understood by referring to the following description in conjunction with the accompanying drawings, in which:

FIG. 3 illustrates one embodiment of a linear indexing scheme for tiles of a matrix.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for performing in-place matrix transpose operations are contemplated. In various embodiments, a system includes one or more processors and a memory. In one embodiment, the one or more processors include a graphics processing unit (GPU). The system is configured to detect a request to transpose a matrix stored in the memory. The matrix is partitioned into a plurality of tiles. Depending on the embodiment, the tiles include any number of adjacent entries of the matrix. The tiles may also be referred to as sub-matrices. In response to detecting the request to transpose the matrix, the system is configured to schedule operations for transposing tiles of the matrix by moving diagonally through tiles of the matrix. When a diagonal line reaches a boundary of the matrix, a new diagonal line (which is parallel to the previous diagonal line) is traversed through the matrix while scheduling operations for transposing tiles of the new diagonal line. Only tiles within a triangular portion of the matrix are scheduled for being transposed. Then, after all tiles within the triangular portion of the matrix have been scheduled to be transposed, a subsequent operation is performed on the transposed matrix once all scheduled transpose operations have been completed. In one embodiment, the subsequent operation is a Fourier transform.

Figure 1:
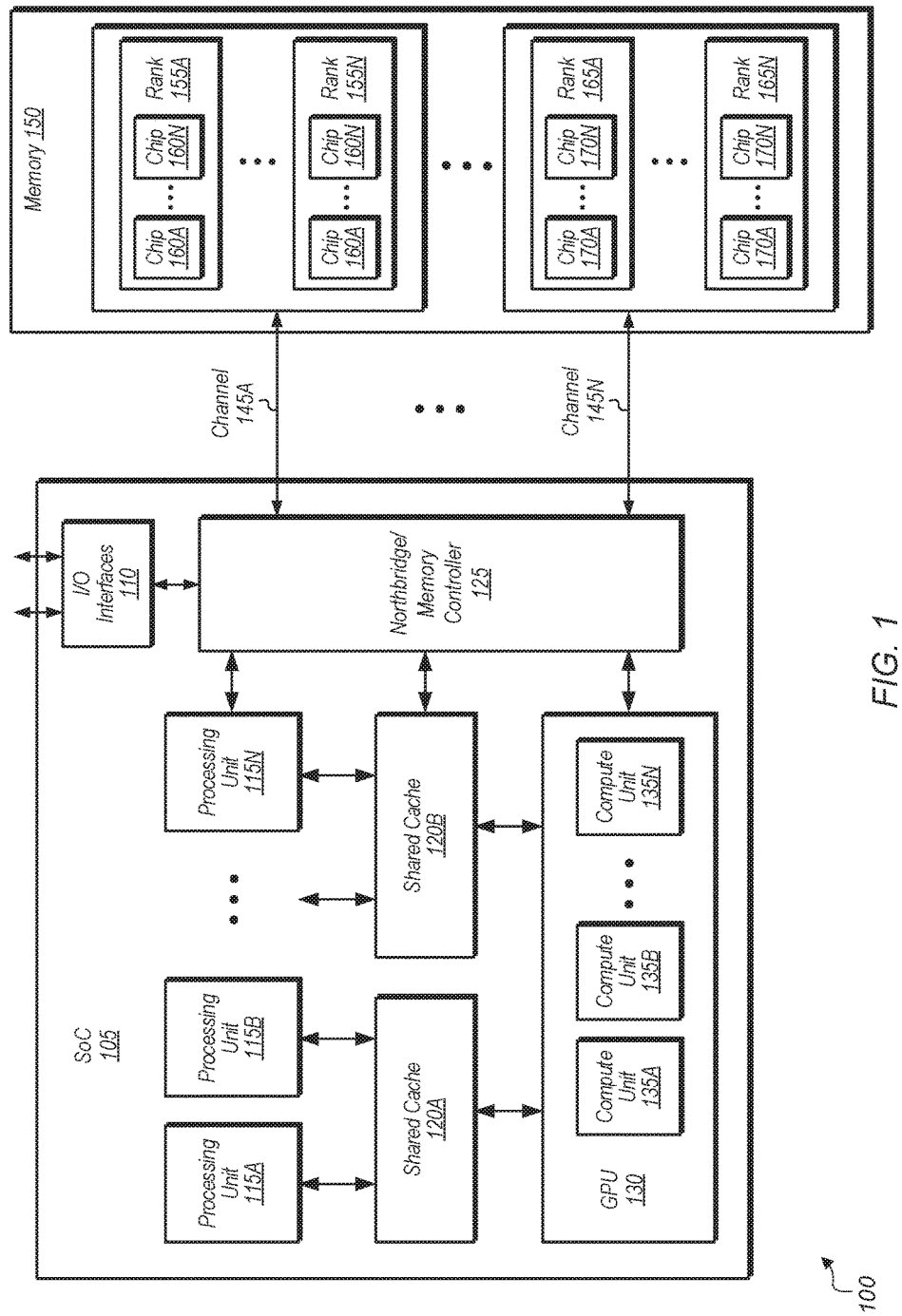
FIG. 1 is a block diagram of one embodiment of a computing system.

Referring now to FIG. 1, a block diagram of one embodiment of a computing system 100 is shown. In one embodiment, computing system 100 includes system on chip (SoC) 105 coupled to memory 150 via channels 145A-N. SoC 105 may also be referred to as an integrated circuit (IC). In one embodiment, SoC 105 includes processing units 115A-N, input/output (I/O) interfaces 110, shared caches 120A-B, and graphics processing unit (GPU) 130. Processing units 115A-N are representative of any number and type of processing units. In one embodiment, processing units 115A-N are central processing unit (CPU) cores. Processing units 115A-N are coupled to shared caches 120A-B and an integrated northbridge and memory controller 125.

GPU 130 includes compute units 135A-N which are representative of any number and type of compute units. GPU 130 is coupled to shared caches 120A-B and integrated northbridge and memory controller 125. I/O interfaces 110 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 110. Such peripheral devices include (but are not limited to) displays, keyboards, mice, printers, scanners, joysticks or other types of game controllers, media recording devices, external storage devices, network interface cards, and so forth.

Processing units 115A-N and GPU 130 are configured to generate memory access requests targeting memory 150. The integrated northbridge and memory controller 125 is coupled to memory 150 via channels 145A-N. In another embodiment, integrated northbridge and memory controller 125 is split up into separate northbridge and memory controller units. In some embodiments, memory 150 includes a plurality of memory modules. Each of the memory modules includes one or more memory devices (e.g., memory chips 160) mounted thereon. In some embodiments, memory 150 includes one or more memory devices mounted on a motherboard or other carrier upon which system 100 is also mounted. In one embodiment, memory 150 is used to implement a random access memory (RAM) for use with SoC 105 during operation. The RAM implemented can be static RAM (SRAM) or dynamic RAM (DRAM). The type of DRAM that is used to implement memory 150 includes (but is not limited to) double data rate (DDR) DRAM, DDR2 DRAM, DDR3 DRAM, and so forth.

Channels 145A-N are representative of any number of memory channels for accessing memory 150. On channel 145A, each rank 155A-N of memory 150 includes any number of chips 160A-N with any amount of storage capacity, depending on the embodiment. Each chip 160A-N of ranks 155A-N may include any number of banks, with each bank including any number of storage locations. Similarly, on channel 145N, each rank 165A-N of memory 150 includes any number of chips 170A-N with any amount of storage capacity. In one embodiment, accesses to separate ranks 155A-N within channel 145A will be performed in separate clock cycles. Similarly, accesses to separate ranks 165A-N within channel 145N will be performed in separate clock cycles. This will cause accesses to be serialized when processing units 115A-N and GPU 130 generate consecutive accesses that target separate ranks within a single channel. In other embodiments, the structure of memory 150 can be organized differently among ranks, chips, banks, etc.

Although not explicitly shown in FIG. 1, SoC 105 can also include one or more cache memories that are internal to the processor units 115A-N and compute units 135A-N. In some embodiments, SoC 105 includes shared caches 120A-B that are utilized by processor units 115A-N and compute units 135A-N. In one embodiment, caches 120A-B are part of a cache subsystem including a cache controller.

In one embodiment, a matrix of data elements is stored in memory 150. In some cases, the matrix can utilize over half of the storage capacity of memory 150. In these cases, performing an in-place transpose of the matrix allows the matrix to be transposed without using any additional storage capacity. In one embodiment, the matrix is a square matrix. In one embodiment, GPU 130 is configured to perform an in-place transpose of the matrix by scheduling operations to transpose the matrix in an order which will maximize the amount of data that can be accessed in parallel from memory 150. In one embodiment, the matrix is stored in a column-major format in memory 150, with consecutive elements of the matrix columns stored in contiguous locations in memory 150. In another embodiment, the matrix is stored in a row-major format in memory 150, with consecutive elements of the matrix rows stored in contiguous locations in memory 150.

In one embodiment, the matrix is partitioned into tiles of N×M elements, with N and M being positive integers. It is noted that the term "tile" may also be referred to as a "sub-matrix". In one embodiment, system 100 is configured to transpose the matrix, and the transpose operation is performed by scheduling tiles to be transposed in a staggered diagonal ordering based on each tile's location within the matrix. The staggered diagonal ordering maximizes the amount of data that can be accessed in parallel during the transpose operation. In one embodiment, the kernel for transposing a matrix is written using a computing language such as the Open Computing Language (OpenCL). OpenCL is an industry standard application programming interface (API) for general-purpose computing on graphics processing units (GPGPU).

In various embodiments, computing system 100 may be a computer, laptop, mobile device, server, web server, cloud computing server, storage system, or any of various other types of computing systems or devices. It is noted that the number of components of computing system 100 and/or SoC 105 can vary from embodiment to embodiment. There can be more or fewer of each component/subcomponent than the number shown in FIG. 1. It is also noted that computing system 100 and/or SoC 105 can include other components not shown in FIG. 1. Additionally, in other embodiments, computing system 100 and SoC 105 can be structured in other ways than shown in FIG. 1.

Figure 2:
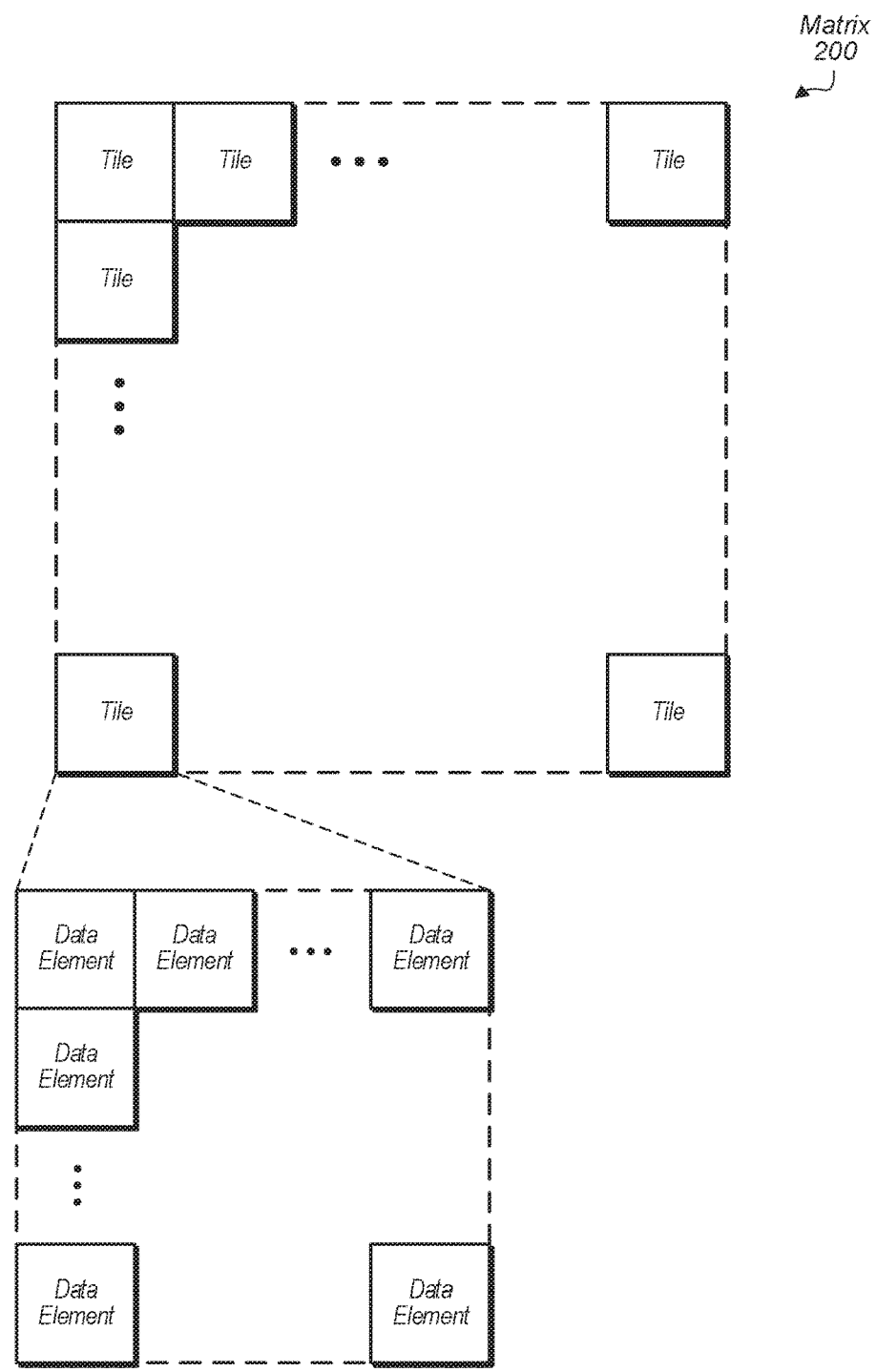
FIG. 2 is a block diagram of one embodiment of a matrix.

Turning now to FIG. 2, a block diagram of one embodiment of a matrix is shown. In one embodiment, matrix 200 is a square matrix. For the purposes of performing a transpose operation, matrix 200 is partitioned into a plurality of tiles, with each tile including a plurality of data elements. The size of each data element (e.g., single precision floating point format, double precision floating point format) can vary from embodiment to embodiment. In one embodiment, matrix 200 is transposed on a tile-by-tile basis. For example, a first tile is scheduled to a compute unit for being transposed, a second tile is scheduled to a compute unit for being transposed, a third tile is scheduled to a compute unit for being transposed, and so on. In one embodiment, tiles are transposed in an order that allows for parallel accesses to be performed to the memory locations storing the matrix.

Referring now to FIG. 3, one embodiment of a linear indexing scheme for transposing tiles of a matrix 300 is shown. The tiles of matrix 300 are shown numbered from 0 to 63. It is noted that the example of matrix 300 having 8 rows of tiles by 8 columns of tiles for a total of 64 tiles is merely indicative of one embodiment. In other embodiments, a matrix can be any of various other sizes with other numbers of rows and columns of tiles. To perform the transpose operation, each tile will exchange its block of data with its transpose tile. Therefore, only tiles whose index falls above or on the diagonal of matrix 300 will be busy. The rest of the tiles in the lower left triangular portion of matrix 300 will remain idle.

The linear indexing scheme of incrementing indices starts by assigning an index of 0 to the top left tile and then increments indices while moving from left to right through the columns and then moving down a row when reaching the right end of the row. When scheduling transpose operations for tiles of matrix 300 according to the indices shown in matrix 300, the transpose operations will be serialized based on the way the data elements of matrix 300 are stored in memory.

For example, in one embodiment, if the matrix is stored in a row-major format, each column of matrix 300 will be stored in memory locations accessible on a single channel of memory. If the tiles assigned indices 0-7 are scheduled on the compute units of the host system or apparatus, these tiles will be transposed with the tiles 0, 8, 16, 24, 32, 40, 48, and 56 of the left-most column of matrix 300. In one embodiment, the data elements of this column of tiles will be stored on the same channel of memory, causing the memory access operations targeting these data elements to be serialized by the compute units. This will result in an inefficient implementation of the transpose operation of matrix 300.

If matrix 300 is stored in a column-major format, then each row of matrix 300 will be stored in memory locations accessible on a single channel of memory. This will cause accesses to rows of tiles 0-7 to be serialized since these accesses will target the same channel in memory. Accordingly, the linear indexing scheme shown for the tiles of matrix 300 suffers from inefficient serialized memory accesses when transposing matrix 300.

Figure 4:
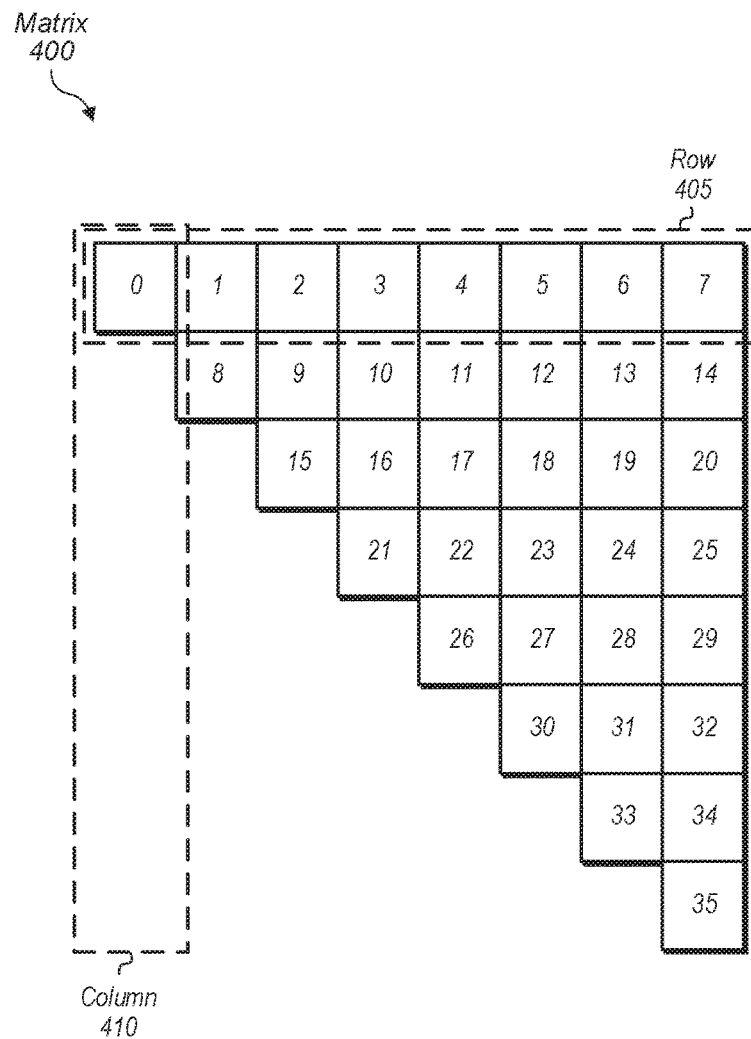
FIG. 4 illustrates another embodiment of a tile indexing scheme for transposing a matrix.

Turning now to FIG. 4, another embodiment of a tile indexing scheme for transposing a matrix 400 is shown. Matrix 400 only includes indices for the upper right triangular portion of tiles. Each tile shown with an index in matrix 400 will be exchanged with its transpose tile during the transpose operation. However, the linear indexing scheme of incrementing indices while moving horizontally through the rows of matrix 400 will still result in memory channel conflicts. For example, when the tiles of row 405 are transposed, all of these tiles will access tiles from column 410. When matrix 400 is stored using a row-major format, then the tiles of column 410 will be stored in the same memory channel(s). This will result in accesses to the tiles of column 410 being serialized and prevent memory access operations from being performed in parallel. When matrix 400 is stored using a column-major format, then the tiles of row 405 will be stored in the same memory channel(s). This will result in accesses to the tiles of row 405 being serialized and prevent memory access operations from being performed in parallel. Consequently, performing the transpose operation of matrix 400 will be inefficient, especially for embodiments when matrix 400 has a large number of data elements.

Figure 5:
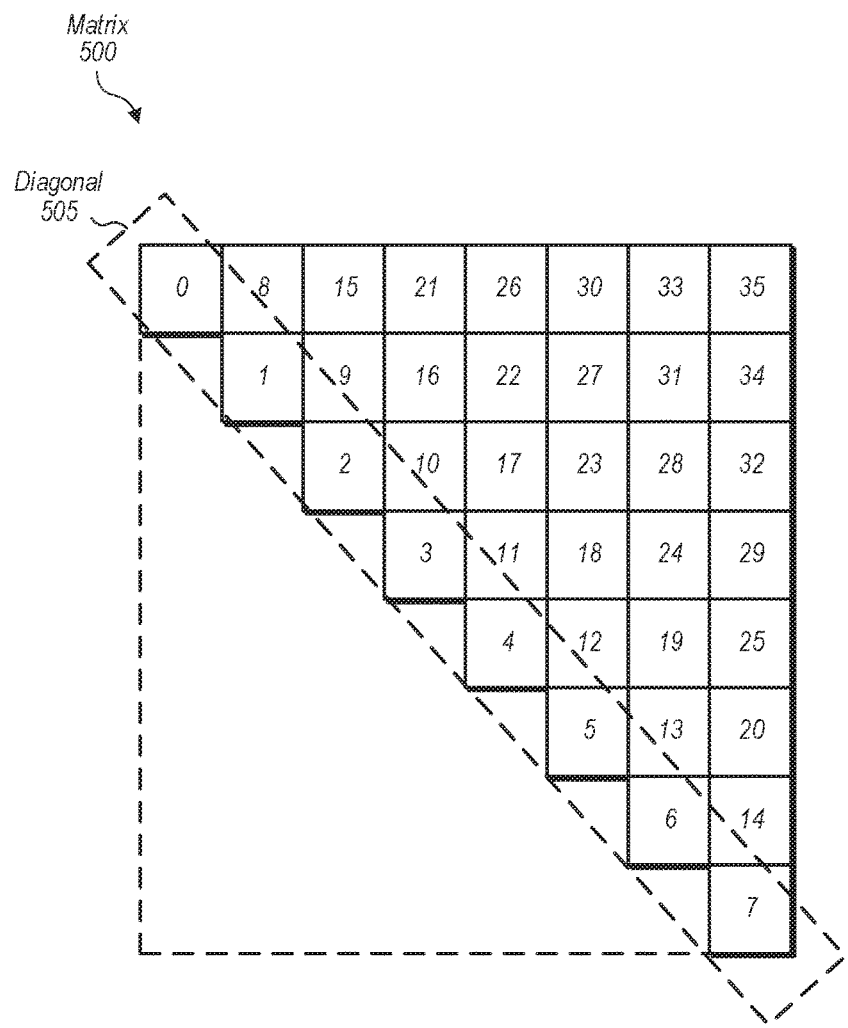
FIG. 5 illustrates one embodiment of a staggered diagonal tile indexing scheme for transposing a matrix.

Referring now to FIG. 5, an embodiment of a staggered diagonal tile indexing scheme for transposing a matrix 500 is shown. Instead of assigning indices to tiles in a linear manner as shown in matrix 400 (of FIG. 4), the tiles of matrix 500 are scheduled to be transposed using a staggered diagonal ordering scheme. For example, the diagonal line 505 is shown to illustrate the order in which tiles are scheduled for being transposed. The top left tile with an index of 0 is scheduled for being transposed, then moving diagonally to the bottom right, the next tile with an index of 1 is scheduled for being transposed, the next tile down and to the right with an index of 2 is scheduled for being transposed, and so on. When the end of diagonal 505 is reached at the boundary of matrix 500, a new diagonal line (parallel to diagonal 505) is traced through matrix 500 and operations for transposing tiles are scheduled for the new diagonal line in a similar fashion as for diagonal 505. For example, the tile to the right of tile 0 with an index of 8 is scheduled for being transposed, and then moving diagonally down and to the right, tiles are scheduled for being transposed (i.e., 9, 10, 11) as the diagonal moves through tiles until reaching the right boundary of matrix 500. Operations for transposing tiles of matrix 500 are scheduled in an order determined by moving in diagonal lines through matrix 500 as indicated by the indices of the tiles. This ensures that memory access operations are able to access data in memory in a parallel fashion when transposing tiles of matrix 500.

In one embodiment, the indices shown for the tiles of matrix 500 are calculated on-the-fly. In one embodiment, the indices are calculated according to the following formula:

Index=$|Y-X|*N+X-\frac{1}{2}*(Y-X)(Y-X-1)$

In the above formula, 'X' is the row of the matrix (from 0 to 7 for matrix 500), 'Y' is the column of the matrix (from 0 to 7), and 'N' is the number of rows (or columns) of the matrix (for a square matrix). In other embodiments, other formulas can be utilized for generated indices of the tiles of the matrix. In one embodiment, the index for each tile is calculated independently from the indices calculated for other tiles.

Figure 6:
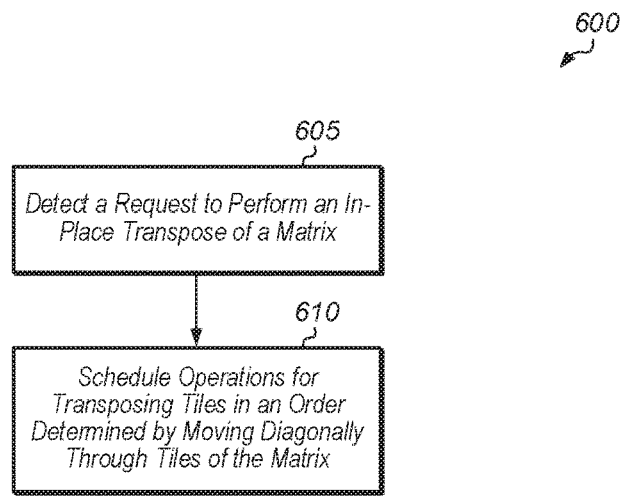
FIG. 6 is a generalized flow diagram illustrating one embodiment of a method for performing an in-place matrix transpose operation.
Figure 7:
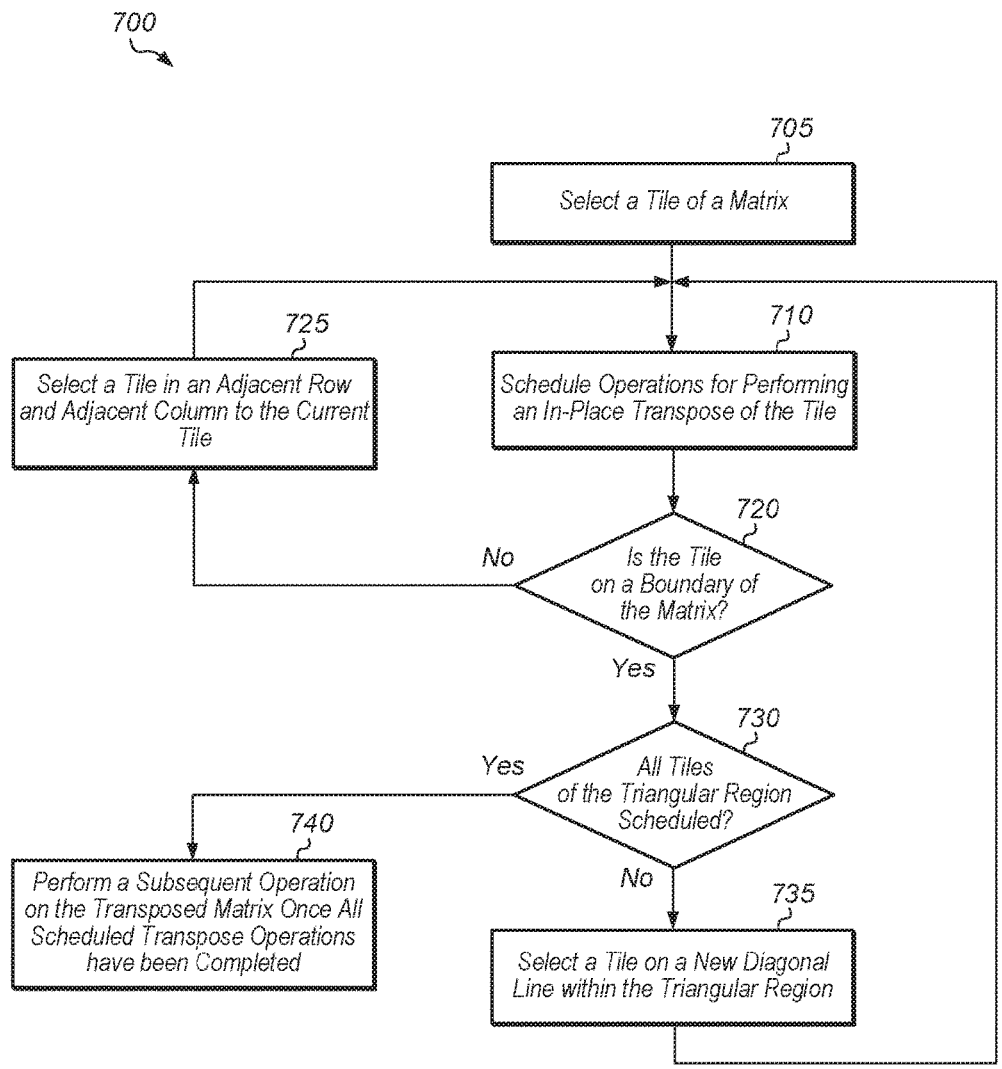
FIG. 7 is a generalized flow diagram illustrating one embodiment of a method for transposing a matrix.

Turning now to FIG. 6, one embodiment of a method 600 for performing an in-place matrix transpose operation is shown. For purposes of discussion, the steps in this embodiment and those of FIG. 7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 600.

A computing system (e.g., computing system 100 of FIG. 1) detects a request to perform an in-place transpose of a matrix (block 605). The computing system includes a plurality of compute units and one or more memory devices for storing the matrix. In one embodiment, the request to perform an in-place transpose of the matrix is detected when a processor executes instruction(s) to initiate an in-place transpose of the matrix. In one embodiment, the matrix is stored in row-major format in memory. In another embodiment, the matrix is stored in column-major format in memory. In one embodiment, the matrix is a square matrix. In another embodiment, the matrix is a rectangular matrix.

In response to detecting the request to perform an in-place transpose of the matrix, the computing system schedules operations for transposing tiles in an order determined by moving diagonally through tiles of the matrix (block 610). By scheduling operations for transposing tiles of the matrix using the staggered diagonal ordering of tiles, memory access operations are capable of being performed in parallel by the computing units of the system when accessing the matrix stored in memory. After block 615, method 600 ends.

Referring now to FIG. 7, one embodiment of a method 700 for transposing a matrix is shown. In the example shown, a tile of a matrix is selected (block 705). In one embodiment, the first tile of the matrix which is selected is the tile in the top left corner of the matrix. Next, operations are scheduled for performing an in-place transpose of the tile (block 710). Next, it is determined whether the tile is on a boundary of the matrix in the direction of the current diagonal line being traversed (conditional block 720). In other words, it is determined in conditional block 720 whether the edge of the matrix has been reached on the path of the current diagonal line. If the tile is not on a boundary of the matrix in the direction of the current diagonal line being traversed (conditional block 720, "no" leg), then a tile in an adjacent row and adjacent column to the current tile is selected (block 725). In other words, in block 725, another tile is selected within the matrix in a diagonal direction from the current tile. Then, method 700 returns to block 710.

If the tile is on a boundary of the matrix in the direction of the current diagonal line being traversed (conditional block 720, "yes" leg), then it is determined if all of the tiles of a triangular region of the matrix have been scheduled for being transposed (conditional block 730). If not all of the tiles of the triangular region of the matrix have been scheduled to be transposed (conditional block 730, "no" leg), then a tile on a new diagonal line within the triangular region is selected (block 735). Then, method 700 returns to block 710. If all of the tiles of the triangular region of the matrix have been scheduled to transposed (conditional block 730, "yes" leg), then a subsequent operation is performed on the transposed matrix once all scheduled transpose operations have been completed (block 740). In one embodiment, the subsequent operation is a Fourier transform. In other embodiments, other subsequent operations can be performed. After block 740, method 700 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
one or more processors; and
a memory device comprising a plurality of memory channels, wherein the memory is configured to store program instructions and a matrix of data elements;
wherein the program instructions are executable by the one or more processors to:
detect a request to perform an in-place transpose of the matrix;
schedule operations for transposing tiles of the matrix in the memory, wherein the operations are scheduled in an order determined by moving diagonally through tiles of the matrix; and
perform the in-place transpose of the matrix by moving diagonally through tiles of the matrix and exchanging data elements from each tile stored in the memory with a transpose tile stored in the memory, wherein moving diagonally through tiles of the matrix causes each tile being transposed to be stored on a different memory channel of the plurality of memory channels from a next tile being transposed.

2. The system as recited in claim 1, wherein the operations are scheduled in an order determined by moving diagonally from a top left corner to a bottom right corner of the matrix, and wherein subsequent operations are scheduled in an order determined by moving through the matrix in diagonal lines parallel to a line from the top left corner to the bottom right corner.

3. The system as recited in claim 1, wherein the program instructions are further executable by the one or more processors to:
schedule operations for transposing a first tile of the matrix by accessing a first memory channel;
select a second tile of an adjacent row and an adjacent column from the first tile; and
schedule operations for transposing the second tile of the matrix by accessing a second memory channel different from the first memory channel.

4. The system as recited in claim 1, wherein the program instructions are further executable by the one or more processors to schedule operations for transposing tiles that are located within only a triangular portion of the matrix, and wherein tiles located outside of the triangular portion of the matrix are not scheduled for being transposed.

5. The system as recited in claim 1, wherein the program instructions are further executable by the one or more processors to calculate tile indices for scheduling tiles of the matrix according to a formula, wherein each index is calculated as being equal to $|Y-X|*N+X-\frac{1}{2}*(Y-X)(Y-X-1)$, wherein X is a row of the matrix, wherein Y is a column of the matrix, and wherein N is a number of rows of the matrix.

6. The system as recited in claim 1, wherein the operations are scheduled in an order that allows for parallel accesses to be performed to memory locations storing the matrix of data elements.

7. The system as recited in claim 1, wherein the matrix is stored in row-major format in the memory.

8. A method comprising:
detecting a request to perform an in-place transpose of a matrix stored in a memory device comprising a plurality of memory channels, responsive to a processor comprising circuitry executing a program instruction to initiate an in-place transpose of the matrix;
scheduling operations for transposing tiles of the matrix in the memory, wherein the operations are scheduled in an order determined by moving diagonally through tiles of the matrix; and
performing the in-place transpose of the matrix by moving diagonally through tiles of the matrix and exchanging data from each tile with a transpose tile store in the memory, wherein moving diagonally through tiles of the matrix causes each tile being transposed to be stored on a different memory channel of the plurality of memory channels from a next tile being transposed.

9. The method as recited in claim 8, wherein the operations are scheduled in an order determined by moving diagonally from a top left corner to a bottom right corner of the matrix, and wherein subsequent operations are scheduled in an order determined by moving through the matrix in diagonal lines parallel to a line from the top left corner to the bottom right corner.

10. The method as recited in claim 8, further comprising executing one or more programs instructions for:
scheduling operations for transposing a first tile of the matrix by accessing a first memory channel;
selecting a second tile of an adjacent row and an adjacent column from the first tile; and
scheduling operations for transposing the second tile of the matrix by accessing a second memory channel different from the first memory channel.

11. The method as recited in claim 8, further comprising scheduling operations for transposing tiles that are located within only a triangular portion of the matrix, and wherein tiles located outside of the triangular portion of the matrix are not scheduled for being transposed.

12. The method as recited in claim 8, further comprising calculating tile indices for scheduling operations for transposing tiles of the matrix according to a formula, wherein each index is calculated as being equal to $|Y-X|*N+X-\frac{1}{2}*(Y-X)(Y-X-1)$, wherein X is a row of the matrix, wherein Y is a column of the matrix, and wherein N is a number of rows of the matrix.

13. The method as recited in claim 8, wherein the operations are scheduled in an order that allows for parallel accesses to be performed to memory locations storing the matrix of data elements.

14. The method as recited in claim 8, wherein the matrix is stored in row-major format in the memory.

15. A non-transitory computer readable storage medium storing program instructions, wherein the program instructions are executable by a processor to:
detect a request to perform an in-place transpose of a matrix stored in a memory device comprising a plurality of memory channels, responsive to the processor executing a program instruction to initiate an in-place transpose of the matrix;

schedule operations for transposing tiles of the matrix in the, wherein the operations are scheduled in an order determined by moving diagonally through tiles of the matrix; and perform the in-place transpose of the matrix by moving diagonally through tiles of the matrix and exchanging data from each tile with a transpose tile, wherein moving diagonally through tiles of the matrix causes each tile being transposed to be stored on a different memory channel of the plurality of memory channels from a next tile being transposed.

16. The non-transitory computer readable storage medium as recited in claim 15, wherein the operations are scheduled in an order determined by moving diagonally from a top left corner to a bottom right corner of the matrix, and wherein subsequent operations are scheduled in an order determined by moving through the matrix in diagonal lines parallel to a line from the top left corner to the bottom right corner.

17. The non-transitory computer readable storage medium as recited in claim 15, wherein program instructions are further executable by a processor to:

schedule operations for transposing a first tile of the matrix by accessing a first memory channel;

select a second tile of an adjacent row and an adjacent column from the first tile; and schedule operations for transposing the second tile of the matrix by accessing a second memory channel different from the first memory channel.

18. The non-transitory computer readable storage medium as recited in claim 15, wherein the program instructions are further executable by a processor to schedule operations for transposing tiles that are located within only a triangular portion of the matrix, and wherein tiles located outside of the triangular portion of the matrix are not scheduled for being transposed.

19. The non-transitory computer readable storage medium as recited in claim 15, wherein the program instructions are further executable by the processor to calculate tile indices for scheduling tiles of the matrix according to a formula, wherein each index is calculated as being equal to $|Y-X|*N+X-\frac{1}{2}*(Y-X)(Y-X-1)$, wherein X is a row of the matrix, wherein Y is a column of the matrix, and wherein N is a number of rows of the matrix tiles located outside of the triangular portion of the matrix are not scheduled for being transposed.

20. The non-transitory computer readable storage medium as recited in claim 15, wherein the operations are scheduled in an order that allows for parallel accesses to be performed to memory locations storing the matrix of data elements.

* * * * *